(12) United States Patent
Hedman et al.

(10) Patent No.: US 11,115,838 B2
(45) Date of Patent: Sep. 7, 2021

(54) SERVICE AREA DEFINITION AT NETWORK SLICING

(71) Applicant: Telefonaktiebolaget LM Ericsson (publ), Stockholm (SE)

(72) Inventors: Peter Hedman, Helsingborg (SE); Peter Ramle, Mölnlycke (SE); Aldo Bolle, Västra Frölunda (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/345,110

(22) PCT Filed: Aug. 13, 2018

(86) PCT No.: PCT/EP2018/071909
§ 371 (c)(1),
(2) Date: Apr. 25, 2019

(87) PCT Pub. No.: WO2019/034601
PCT Pub. Date: Feb. 21, 2019

(65) Prior Publication Data
US 2019/0289475 A1 Sep. 19, 2019

Related U.S. Application Data

(60) Provisional application No. 62/545,710, filed on Aug. 15, 2017.

(51) Int. Cl.
*H04W 84/04* (2009.01)
*H04W 24/02* (2009.01)

(52) U.S. Cl.
CPC .......... *H04W 24/02* (2013.01); *H04W 84/042* (2013.01)

(58) Field of Classification Search
CPC .......................... H04W 24/02; H04W 84/042
See application file for complete search history.

(56) References Cited

U.S. PATENT DOCUMENTS

2017/0303259 A1* 10/2017 Lee ..................... H04W 12/08
2017/0339609 A1* 11/2017 Youn .................... H04W 76/11

FOREIGN PATENT DOCUMENTS

WO     2017135860 A1    8/2017

OTHER PUBLICATIONS

Author Unknown, "Technical Specification Group Services and System Aspects; System Architecture for the 5G System; Stage 2 (Release 15)," Technical Specification 23.501, Version 0.4.0, 3GPP Organizational Partners, Apr. 2017, 124 pages.

(Continued)

*Primary Examiner* — Joseph E Dean, Jr.
(74) *Attorney, Agent, or Firm* — Withrow & Terranova, PLLC

(57) ABSTRACT

Embodiments of a method in a radio access node and a corresponding radio access node are disclosed. The method comprises: sending, to a mobility function entity, first information indicative of a tracking area(s) and a network slice(s) supported by the radio access node; and receiving, from the mobility function entity, second information indicative of a network slice(s) that are: (a) supported by the radio access node and the mobility function entity and (b) permitted by one or more network policies, for each of at least one of the tracking area(s) supported by the radio access node; or (a) supported by the mobility function entity and (b) permitted by one or more network policies, for each of at least one of the tracking area(s) supported by the radio access node. Embodiments of a method in a mobility function entity and a corresponding mobility function entity are also disclosed.

24 Claims, 14 Drawing Sheets

(56) References Cited

OTHER PUBLICATIONS

Author Unknown, "Technical Specification Group Services and System Aspects; System Architecture for the 5G System; Stage 2 (Release 15)," Technical Specification 23.501, Version 1.2.0, 3GPP Organizational Partners, Jul. 2017, 166 pages.
Author Unknown, "Technical Specification Group Services and System Aspects; Procedures for the 5G System; Stage 2 (Release 15)," Technical Specification 23.502, Version 0.3.0, 3GPP Organizational Partners, Mar. 2017, 115 pages.
Ericsson, "R3-171713: NW slicing support at NG-C establishment and update," Third Generation Partnership Project (3GPP), TSG-RAN WG3 #96, May 15-19, 2017, 12 pages, Hangzhou, China.
Huawei, et al., "S2-175296: Network Slice Instance selection," Third Generation Partnership Project (3GPP), SA WG2 Meeting #122, Jun. 26-30, 2017, 22 pages, Cabo, Mexico.
Huawei, "S5-173436: Add requirements of management support for RAN configuration," Third Generation Partnership Project (3GPP), TSG SA WG5 (Telecom Management) Meeting #113, May 8-12, 2017, 4 pages, West Palm Beach, Florida (US).
Nokia, et al., "R2-1705325: Slice Assistance Information over RRC," Third Generation Partnership Project (3GPP), TSG-RAN WG2 Meeting #98, May 15-19, 2017, 5 pages, Hangzhou, China.
RAN WG3, "S2-172933: LS on slice re-mapping during connected mode mobility," Third Generation Partnership Project (3GPP), SA WG2 Meeting #S2-121, May 15-19, 2017, 2 pages, Hangzhou, P. R. China.
SA WG2, "R3-172096: Response LS on slice re-mapping during connected mode mobility," Third Generation Partnership Project (3GPP), TSG-RAN WG2 NR#2 Adhoc, Jun. 27-29, 2017, 2 pages, Qingdao, China.
SA WG2, "S2-174019: Response LS on slice-remapping during connected mode mobility," Third Generation Partnership Project (3GPP), TSG-SA WG2 Meeting #121, May 15-19, 2017, 2 pages, Hangzhou, China.
International Search Report and Written Opinion for International Patent Application No. PCT/EP2018/071909, dated Oct. 10, 2018, 13 pages.
Huawei, "R3-171767: Slice exchange during NG Setup," 3GPP TSG-RAN WG3 Meeting #96, May 15-19, 2017, Hangzhou, China, 2 pages.
Second Written Opinion for International Patent Application No. PCT/EP2018/071909, dated Jul. 3, 2019, 8 pages.
Etri, "S2-161447: Solution for network function selection within a network slice," SA WG2 Temporary Document, 3GPP SA WG2 Meeting #114, Apr. 11-15, 2016, Sophia Antipolis, France, 3 pages.
Intention to Grant for European Patent Application No. 18755186.6, dated Jun. 4, 2021, 5 pages.
Grant of Patent for Korean Patent Application No. 10-2020-7006934, dated Jun. 8, 2021, 4 pages.

\* cited by examiner

SERVICE AREA DEFINITION AT NETWORK SLICING

This application is a 35 U.S.C. § 371 national phase filing of International Application No. PCT/EP2018/071909, filed Aug. 13, 2018, which claims the benefit of U.S. Provisional Application No. 62/545,710, filed Aug. 15, 2017, the disclosures of which are incorporated herein by reference in their entireties.

TECHNICAL FIELD

The present disclosure relates to network slicing in a wireless communication system.

BACKGROUND

In Fifth Generation (5G) networks, a Network Slice is introduced as s logical network that provide specific network capabilities and network characteristics. An instance of a network slice (i.e., a network slice instance) is a set of Network Function (NF) instances (also called NF entities) and the required resources (e.g., compute, storage, and networking resources) which form a deployed Network Slice. A NF is a 3GPP adopted or 3GPP defined processing function in a network, which has defined functional behavior and 3GPP defined interfaces. A NF entity can be implemented either as a network element on dedicated hardware, a software instance running on a dedicated hardware, or as a virtualized functional instantiated on an appropriate platform, e.g., on a cloud infrastructure.

A network slice is identified by a Single Network Slice Selection Assistance Information (S-NSSAI), which is comprised of a slice/service type (SST) that refers to the expected network slice behavior in terms of features and services and a slice differentiator (SD) that is optional information that complements the SST(s) to differentiate amongst multiple network slices of the same SST.

Whether in connected or in idle mode, a slice-supporting User Equipment device (UE) may be served by one or multiple network slices. At UE mobility, the availability of the network slices may change, either due to network topology or due to business constraints.

From current text in Third Generation Partnership Project (3GPP) Technical Specification (TS) 23.501 V1.2.0, clause 5.15.5.2.2:

When a Network Slice instance used for a one or multiple PDU Sessions is no longer available, the 5GC initiates a network-triggered PDU session release procedure with an appropriate cause value for the impacted PDU session(s), as defined in TS 23.502 [3], clause 4.3.4. The PDU session(s) may be also implicitly released.

And from "R3-172096: Response LS on slice re-mapping during connected mode mobility," 3GPP TSG-RAN WG3 NR #2 Adhoc, Jun. 27-29, 2017, Qingdao, China:

SA WG2 thank RAN WG3 for the LS in S2-172933 on slice re-mapping during connected mode mobility. SA WG2 discussed the issue of slice availability at the target cell at a NG and Xn handover and want to provide the answers to the questions asked by RAN WG3.

From LS in S2-172933:

Question 1:
Will re-mapping of PDU sessions to new slices be supported in these scenarios or only removal of PDU session/slices?

Answer 1: SA2 understanding is that PDU Session removal of non-supported slices shall be supported in Rel-15.

Question 3:
For Xn based handover where it is not feasible to perform re-mapping prior to UE arriving in target node, what shall the RAN do with PDU session which are associated with slices which are not supported by target RAN node?

Answer 3: It is SA2 understanding that in case of Xn handover the source cell/RAN is aware of the slices supported by the target cell/RAN. If a handover needs to be performed to a target cell/RAN that does not support all slices currently having RAN resources setup in the source cell, it shall trigger a NG(N2) handover.

From the view point of 5G access points, two main interfaces are introduced: NG and Xn interface. The NG interface shall be open and must support the exchange of signalling information between the 5G-RAN and NG-CN. Whilst, the Xn interface must offer logical connectivity between eNB and gNB. The NG interface must be capable of supporting CP and UP separation, at the same time have separate radio network and transport layer specifications. While on the other hand, the Xn interface must support the exchange of signalling information and data forwarding between the endpoints and gNBs. Lastly, the NG interface must be capable of carrying interface management, UE connect and mobility management functions; in addition to the enhanced features to support the transportation of NAS messages, paging and PDU session management.

SUMMARY

Based on the text in 3GPP TS 23.501 V1.2.0 and in S2-172933, it can be seen that the service area of a network slice will not necessarily cover the whole Public Land Mobile Network (PLMN). The reason for partial coverage could be, as mentioned above, inhomogeneous support in the Radio Access Network (RAN), but it also seems reasonable that slice support in the core network is not necessarily homogeneous in a PLMN. In addition to connectivity, RAN, and core network node limitations, operator policies could also put restrictions on where a network slice should be permitted to be used by any UE. Thus, a slice service area for a network slice should be composed by the intersection of the following:

the service areas of the network functions included in the set that form a deployed slice; and
the service area for a deployed slice, defined by operator policies.

According to the answer of SA2 in case of Xn based handover, it is assumed that the source RAN node is aware of the network slices supported by the target RAN node. With exchange of information over the Xn interface, a source RAN node gets to know the network slices that are supported by each other RAN node to which it has an Xn interface. But getting to know the inherent support in the RAN nodes is not sufficient since a network slice may be supported but still not permitted to be used due to the policies of the operator as configured in the Network Slice Selection Function (NSSF).

Thus, a method for identifying the network slices supported and permitted in RAN and core network nodes is needed.

As such, systems and methods relating to identifying network slices supported and permitted in RAN and core network nodes are disclosed.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., an Access and Mobility Management Function (AMF), a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Figure 1:
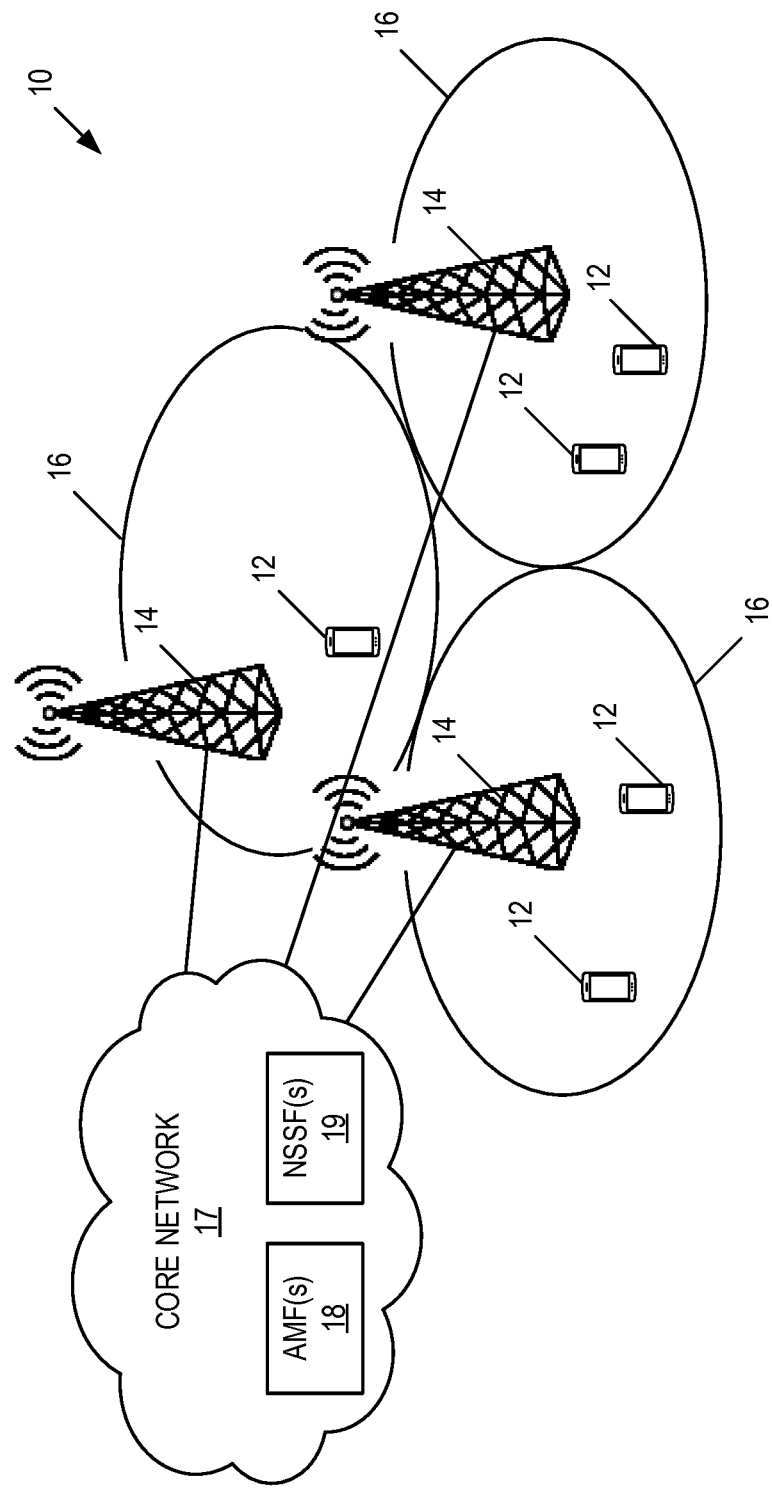
FIG. 1 illustrates one example of a wireless communication system 10 in which embodiments of the present disclosure may be implemented.

FIG. 1 illustrates one example of a wireless communication system 10 in which embodiments of the present disclosure may be implemented. In this example, the wireless communication system 10 is a cellular communications network and, in particular, is a 3GPP New Radio (NR) cellular communications network. As such, 3GPP NR terminology is oftentimes used. Note, however, that the concepts disclosed herein are not limited to 3GPP NR and may be used in other types of wireless communication systems that utilize networking slicing.

As illustrated, the wireless communication system 10 includes a number of wireless devices 12 (i.e., wireless communication devices 12 or UEs 12). In addition, the wireless communication system 10 includes a RAN that includes a number of radio access nodes 14 (e.g., eNBs or NR base stations (gNBs)) serving corresponding coverage areas or cells 16. The radio access nodes 14 are also referred to herein as RAN nodes 14. The radio access nodes 14 are connected to a core network 17, which includes a number of core network nodes or entities, as will be appreciated by one of skill in the art. For a 5G NR network, the core network nodes include, for example, a Access and Mobility Management Function(s) (AMF(s)) 18, a Network Slice Selection Function(s) (NSSF(s)) 18 or similar core network entities, etc., as will be appreciated by one of skill in the art.

In some embodiments, operator policies regarding time (service hours) and location constrains (service area) for a network slice are configured in an NSSF 19 and provided to an AMF(s) 18 at setup of the network and whenever changed (e.g., due to elapse of time). This, in turn, enables the AMF 18 to provide, per Tracking Area (TA), the intersection of operator policies and the inherent support in the AMF 18 to the RAN nodes 14 at N2 setup and at later changes through a configuration update procedure.

In a similar way but in the opposite direction, in some embodiments, the AMF 18 will provide the NSSF 19, per TA, the intersection of the slice support in the AMF 18, and in the RAN node 14. This will enable the NSSF 19 to select target AMF(s) 18 based on what slices are supported by AMF 18 and RAN node 14, per TA.

Some embodiments of the present disclosure incorporate any one or more of the following proposals:

Proposal 1: Let NSSF 19, at setup of the N22 interface, provide AMF 18 with what slices are permitted, per TA, according to operator policies.

Proposal 2: Let the RAN node 14, at setup of the N2 interface, provide AMF 18 with RAN node supported slices per TA.

Proposal 3: Let AMF 18 provide the RAN node 14 with core network supported slices per TA, at setup of the N2 interface and whenever the core network support changes.

Proposal 4: Let the AMF 18 provided core network support of slices, per TA, be determined by the intersection of what slices the AMF 18 supports and what slices are permitted, per TA, according to operator policies provided by the NSSF 19 to AMF 18 at setup of the N22 interface or whenever the operator policies changes.

Proposal 5: Let the AMF 18, at setup of the N22 interface, provide the NSSF 19 with the AMF 18 and RAN node(s) 14 supported slices per TA.

Proposal 6: Let the AMF 18 and RAN node(s) 14 provided support of slices, per TA, be determined by the intersection of what slices the AMF 18 supports and what slices are supported per RAN node(s) 14 and TA.

Whenever new RAN nodes 14 are deployed, the network slices supported and permitted by the network are assessed and provided to the RAN nodes 14. With the information provided and with the exchange of information over the Xn interface, a source RAN node 14 will be able to determine if Xn based handover shall be performed or if N2 based handover shall be used. At the use of N2 based handover and in case of intra AMF handover, the AMF 18 will also be able to conclude what slices, in use by the UE 12, are supported in a target TA. If a slice(s) is not supported in the target TA, then AMF 18, during handover, indicates to the corresponding Session Management Function(s) (SMF(s)) that the slice is not supported in the target TA. The SMF(s) may then release the Protocol Data Unit (PDU) session(s) as defined in 3GPP TS 23.501 clause 5.15.5.2.2 (see above) or the SMF may trigger deactivation of User Plane (UP) resources for the PDU session.

Figure 2A:
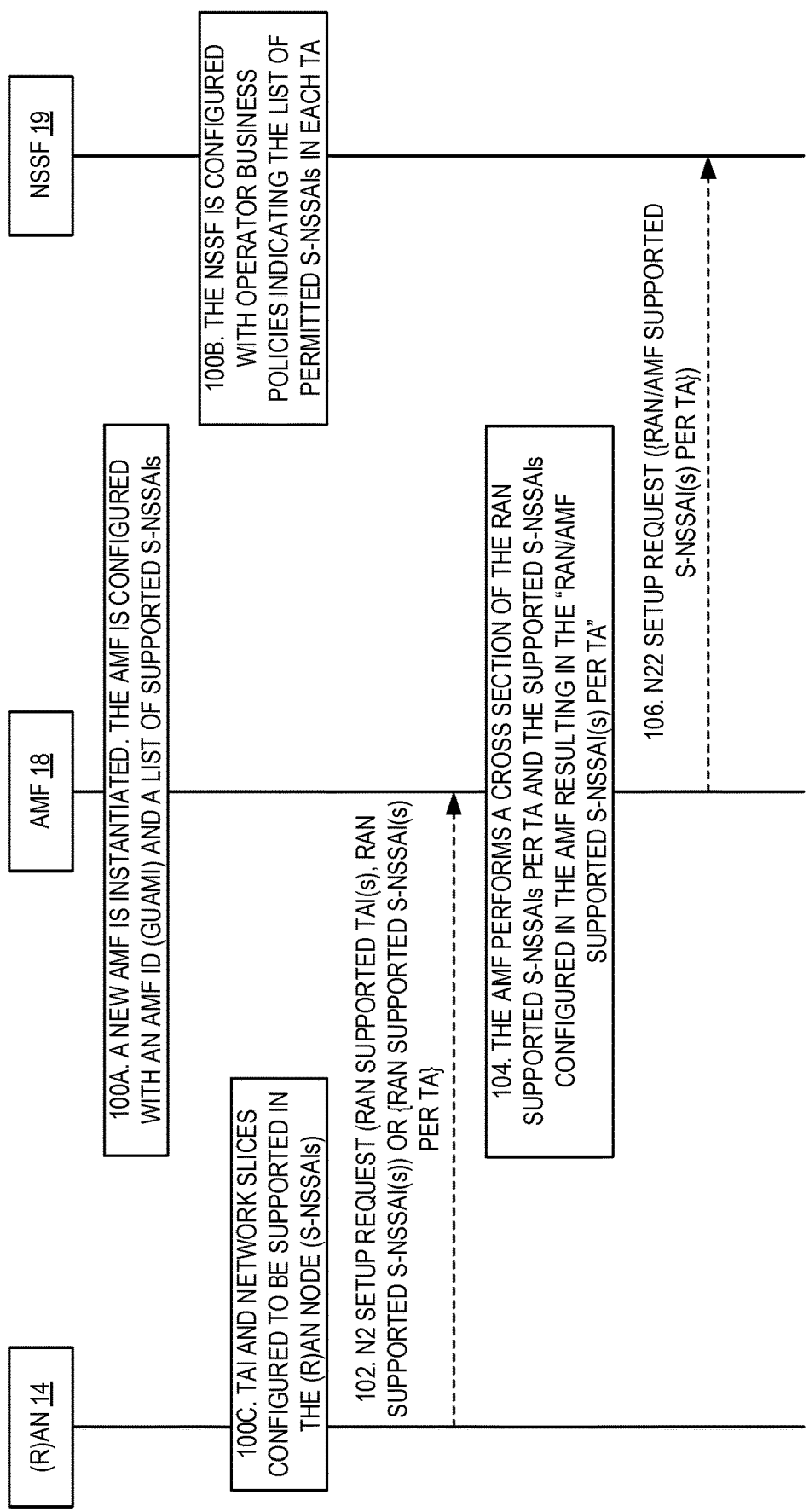
FIGS. 2A and 2B illustrate the operation of the wireless communication system of FIG. 1 in accordance with embodiments in which information related to network slices supported and permitted per TA is distributed when a new AMF and RAN node are instantiated.
Figure 2B:
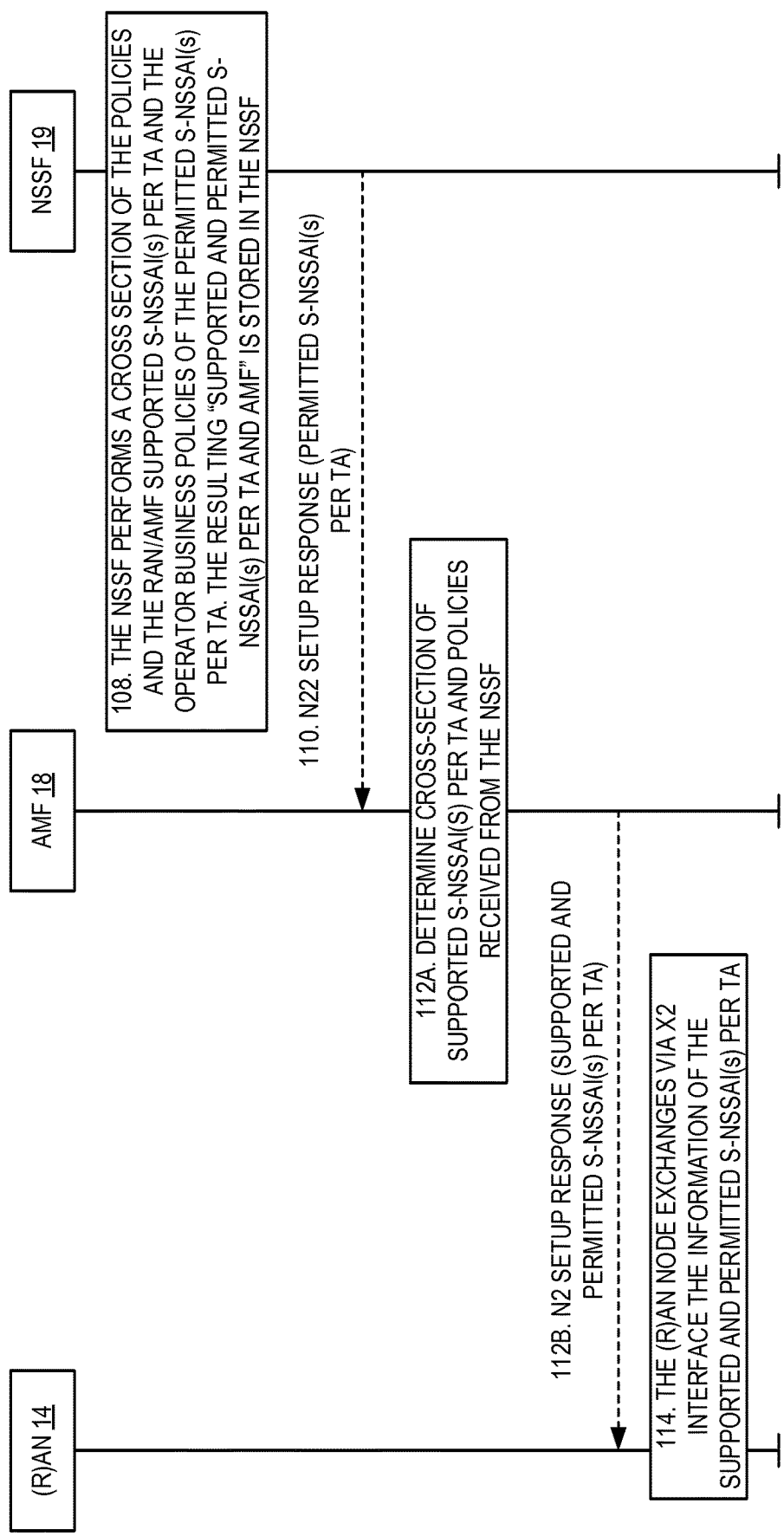

FIGS. 2A and 2B illustrate the operation of the wireless communication system 10 of FIG. 1 in accordance with embodiments in which the information related to the slices supported and permitted in a new TA are distributed when a new slice, and in particular a new AMF 18 and RAN node 14, is instantiated. A new AMF 18 is instantiated and, at deployment of a new RAN node 14, the RAN node 14 sends an N2 setup request, propagating into N22 setup request.

Step 100A:

It is assumed that a new AMF 18 is instantiated in the network. The AMF configuration includes the AMF Identifier (ID), i.e. a Globally Unique AMF Identifier (GUAMI) and the network slice instances, i.e. the Single Network Slice Selection Assistance Information (S-NSSAIs), supported in the AMF 18.

Step 100B:

Similarly, the NSSF 19 is configured with one or more operator (i.e., business) policies for which network slices (i.e., the S-NSSAIs) are permitted in a TA. These policies are network policies that apply to all subscribers.

Step 100C:

A first RAN node 14 is instantiated for the new TA. The RAN node 14 is configured with a TA Identity(s) (TAI(s)) and the network slices (i.e., the S-NSSAIs) it is intended to support. These network slices are referred to herein as the network slices supported by the RAN node 14.

Step 102:

The RAN node 14 discovers the AMF(s) 18 supporting the TAs configured in the RAN node 14 (e.g., through a Domain Name System (DNS) lookup and in this example just one AMF 18). The RAN node 14 initiates the setup of the N2 interface, i.e. the signaling interface between the AMF 18 and the RAN node 14, through an N2 setup request message (or equivalent). In this message, the RAN node 14 reports the supported network slices (i.e., S-NSSAIs) and the TAs it is configured with. This message is sent to all AMFs 18 that the RAN node 14 has connectivity to. Network Slice Selection Assistance Information (NSSAI) support could either be homogeneous over all configured TAs or configured individually per TA.

Step 104:

Triggered by the RAN request, the AMF 18 checks which network slices (i.e., S-NSSAIs) are supported by both the AMF 18 and the RAN node 14 in each TA. This is done as a cross section of the RAN supported S-NSSAIs per TA and the supported S-NSSAIs configured in the AMF 18 and it results in the "RAN/AMF Supported S-NSSAI (s) per TA."

Step 106:

The AMF 18 can now, in principle, serve at least a TA, and needs to establish the connectivity to the NSSF 19 for assessing which network slices (i.e., S-NSSAIs) are permitted in the TA. Note that "permitted" is to be distinguished from "supported". As used herein, a network slice is "permitted" for a TA if the network policies allow the network slice to be used in the TA. The AMF 18 sends a N22 setup request (or equivalent) including the AMF ID and the lists of {RAN/AMF supported S-NSSAI(s) per TA}).

Step 108:

The NSSF 18 determines a cross section of the RAN/AMF supported S-NSSAI(s) per TA and the operator business policies of the permitted S-NSSAI(s) per TA. The resulting "Supported and Permitted S-NSSAI(s) per TA and AMF ID" is stored in the NSSF 18 to be used in a procedure to identify the best suited AMF 18 for serving a UE 12 requesting a specific set of S-NSSAIs.

Step 110:

The NSSF 18 provides the list of permitted S-NSSAI(s) per TA to the AMF in a N22 setup response message. In some alternative embodiments, the NSSF 18 provides the list of supported and permitted S-NSSAI(s) per TA and AMF ID to the AMF 18.

Step 112:

The AMF 18 stores the lists of permitted S-NSSAI(s) per TA to be used in the mobility procedures to compare it with the list of S-NSSAIs active in a UE 12 at handover. The AMF 18 performs a cross section of the AMF supported S-NSSAI(s) per TA and the operator business policies of the permitted S-NSSAI(s) per TA as received from NSSF 19 (step 112A). Note that, for the alternative embodiments mentioned in the preceding paragraph, step 112A would not be needed. The resulting list of supported and permitted S-NSSAI(s) per TA is provided in a N2 setup response to the RAN node 14 (step 112B). Note that, in some alternative embodiments, the AMF 18 provides (in step 112B) a list of the AMF supported and NSSF permitted network slices to the RAN node 14, and the RAN node determines a cross section of the RAN node supported network slices and the AMF supported and NSSF permitted network slices to determine the list of supported and permitted network slices (i.e., S-NSSAI(s)) per TA.

Step 114:

The (R)AN node 14 stores the list of supported and permitted S-NSSAI(s) per TA and when suitable, for instance when it has received the similar information from all AMFs it is connected to, the RAN node 14 exchanges via X2 interface the information of the supported and permitted S-NSSAI(s) per TA to all "neighboring" RAN nodes it has contact with through an X2 interface, if any. This allows the "neighboring" RAN nodes to assess whether a handover for a UE 12 should be performed as X2 handover (in case all active slices are supported by the target RAN node) or as a N2 handover.

Figure 3A:
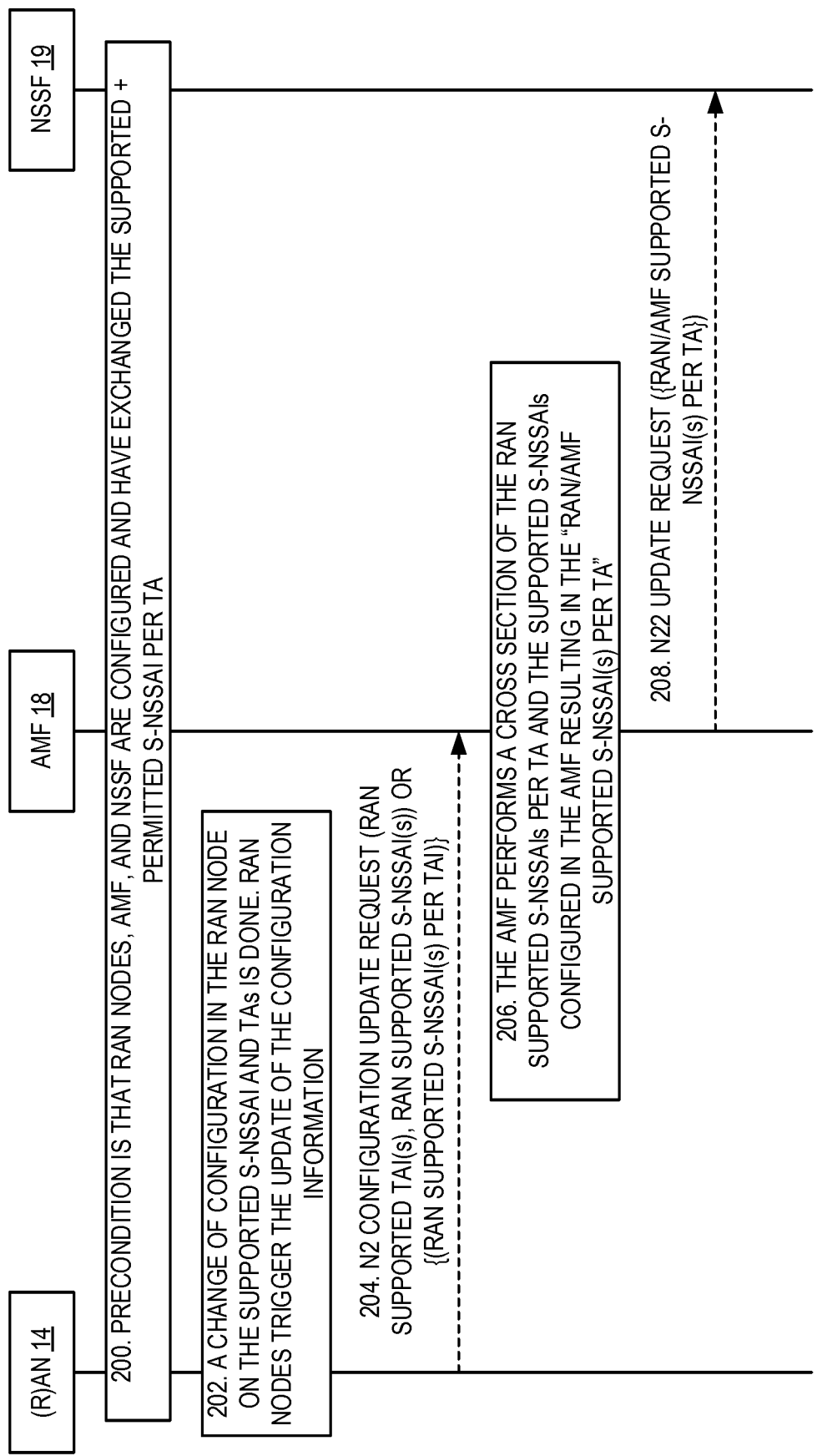
FIGS. 3A and 3B illustrate embodiments in which information related to network slices supported and permitted per TA is distributed when network slice/TA support is changed in the RAN node.
Figure 3B:
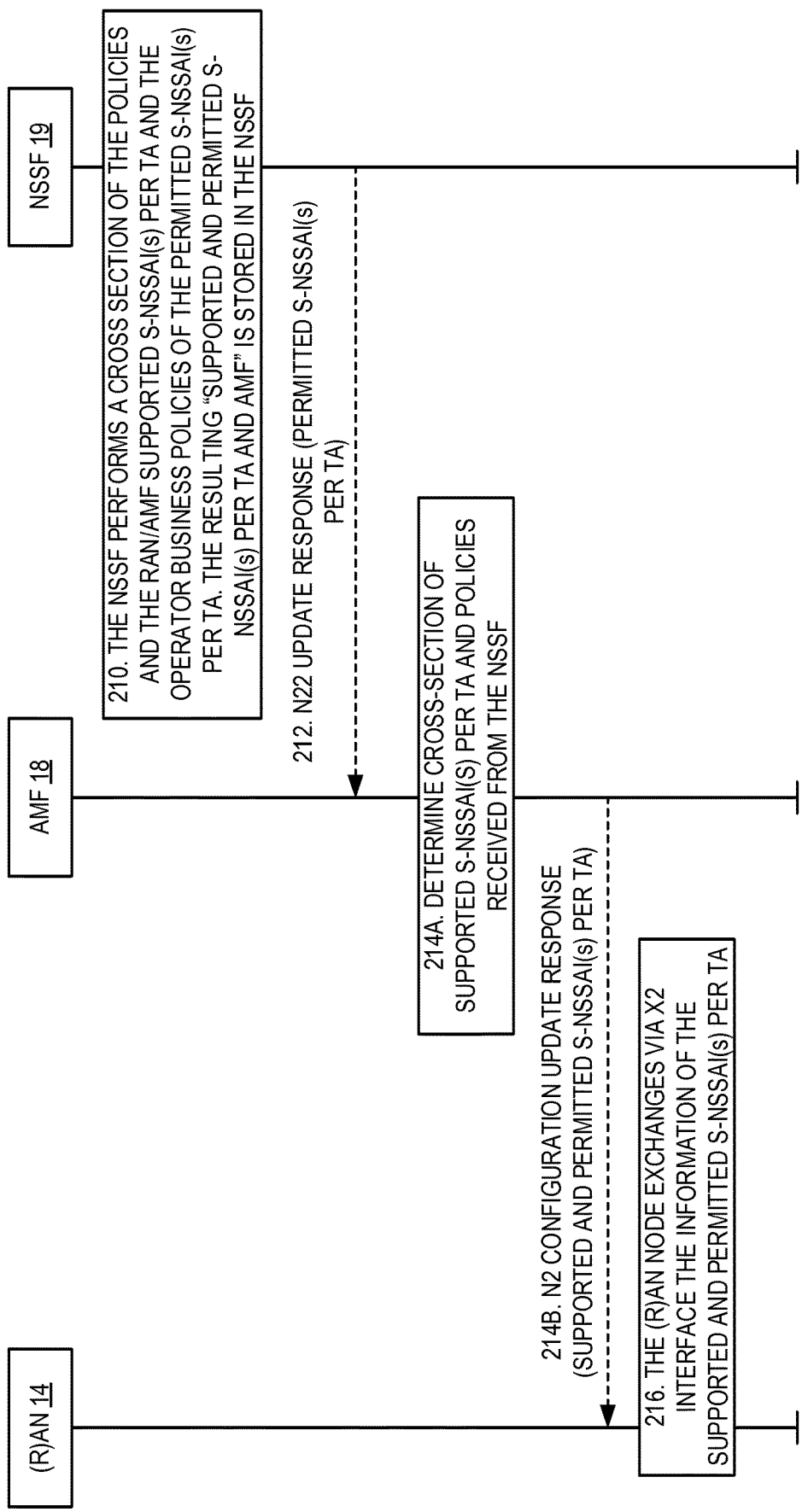

FIGS. 3A and 3B illustrate embodiments in which network slice/TA support is changed in the RAN node 14. In particular, upon occurrence of a change of supported TAs and/or S-NSSAI in RAN node 14, a N2 configuration update request is initiated by the RAN node 14.

Step 200:

A precondition is that RAN nodes 14, AMF 18, and NSSF 19 are configured and have exchanged the supported and permitted S-NSSAI per TA.

Step 202:

A change of configuration in the RAN node 14 on the supported S-NSSAI and/or TAs is done. The RAN node 14 triggers the update of the configuration information.

Steps 204-216:

Follows steps 102-114 described in FIGS. 2A and 2B, but based on N2 configuration update request/response and N22 configuration update request/response in an alternative to the previously described set up messages.

Figure 4A:
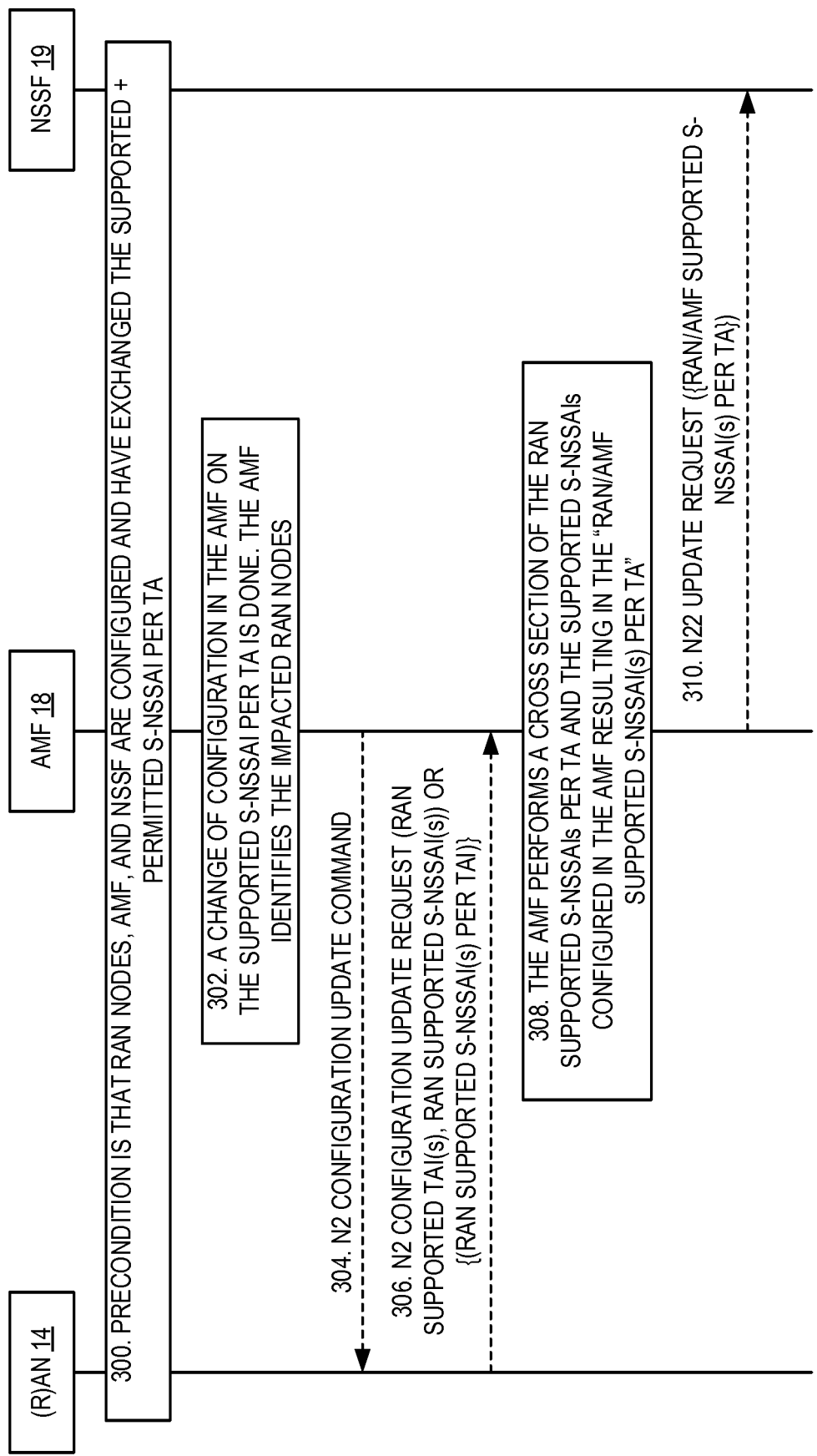
FIGS. 4A and 4B illustrate embodiments in which information related to network slices supported and permitted per TA is distributed when network slice/TA support is changed in the AMF.
Figure 4B:
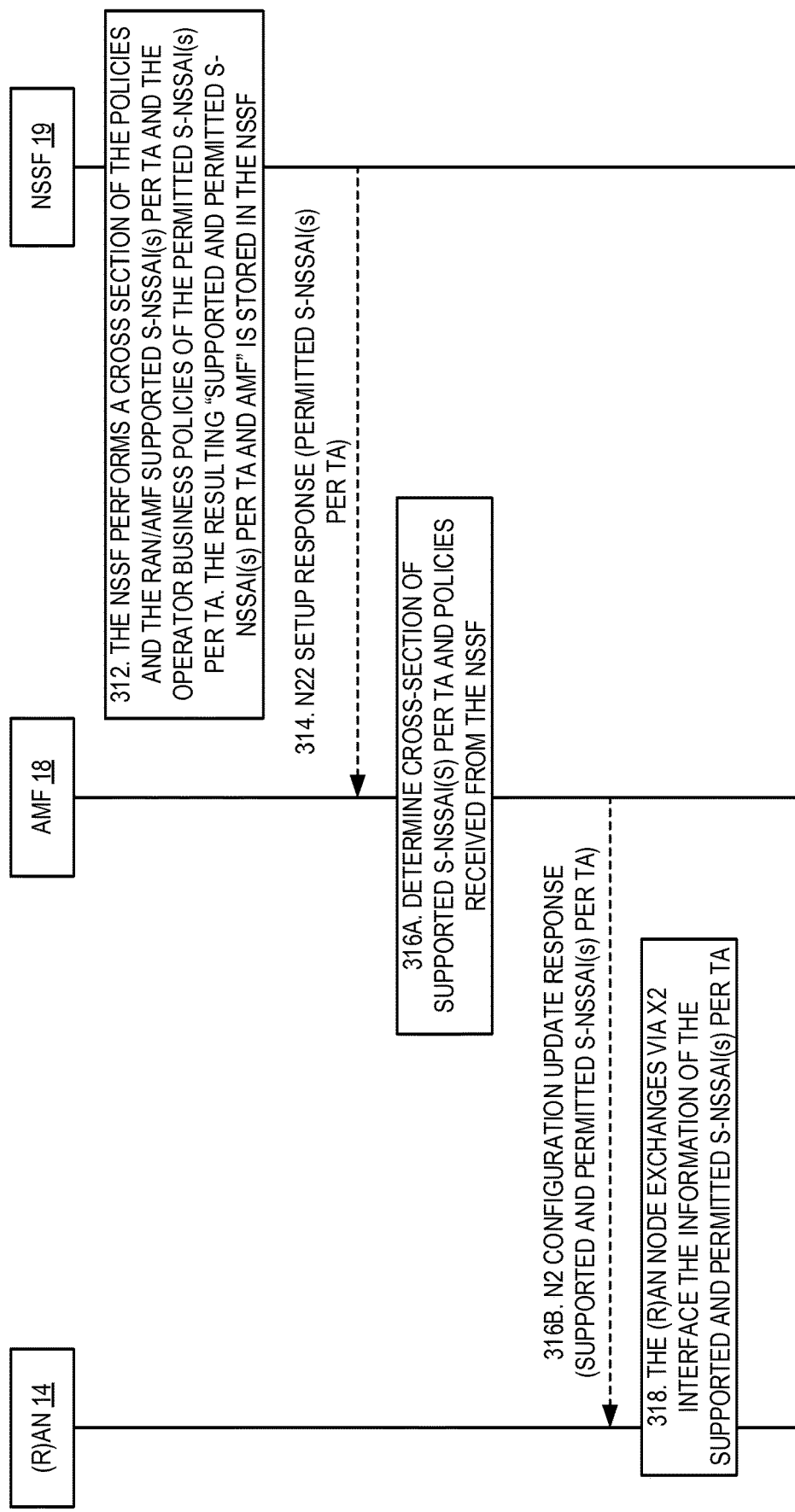

FIGS. 4A and 4B illustrate embodiments in which network slice/TA support is changed in the AMF 18. In particular, upon occurrence of a change of supported NSSAIs in AMF 18, the AMF 18 sends a configuration update command towards the RAN node 14 to initiate an N2 configuration update.

Step 300:

Precondition is that RAN nodes 14, AMF 18, and NSSF 19 are configured and have exchanged the supported and permitted S-NSSAI per TA.

Step 302:

A change of configuration in the AMF 18 on the supported S-NSSAI is done.

Step 304:

The AMF 18 triggers a request for an update of the supported and permitted S-NSSAI per TA in the RAN node 14 through a N2 configuration update command.

Steps 306-318:

Follows steps 204-216 described in FIGS. 3A and 3B.

Figure 5A:
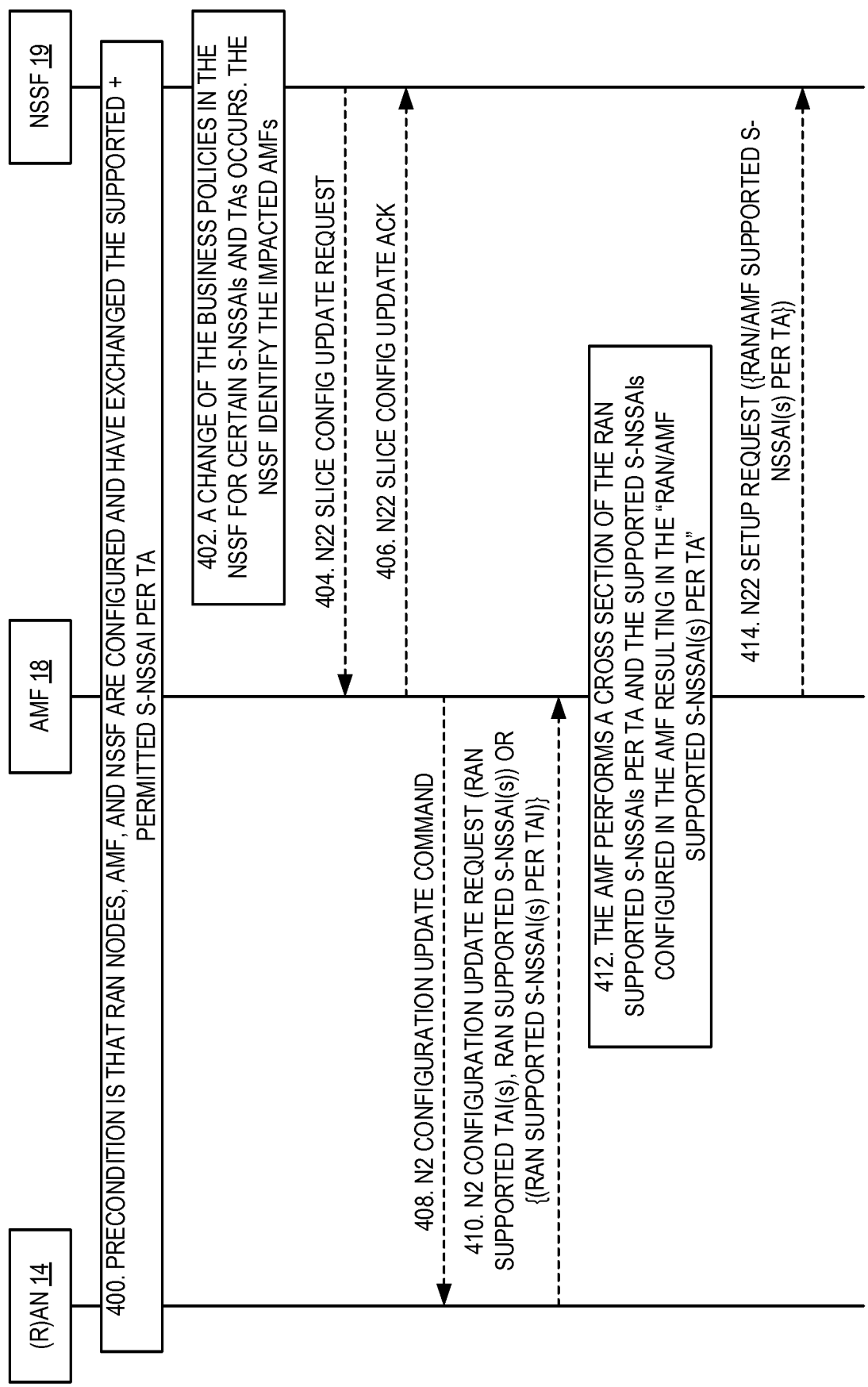
FIGS. 5A and 5B illustrate embodiments in which information related to network slices supported and permitted per TA is distributed when there is a change in business policies.
Figure 5B:
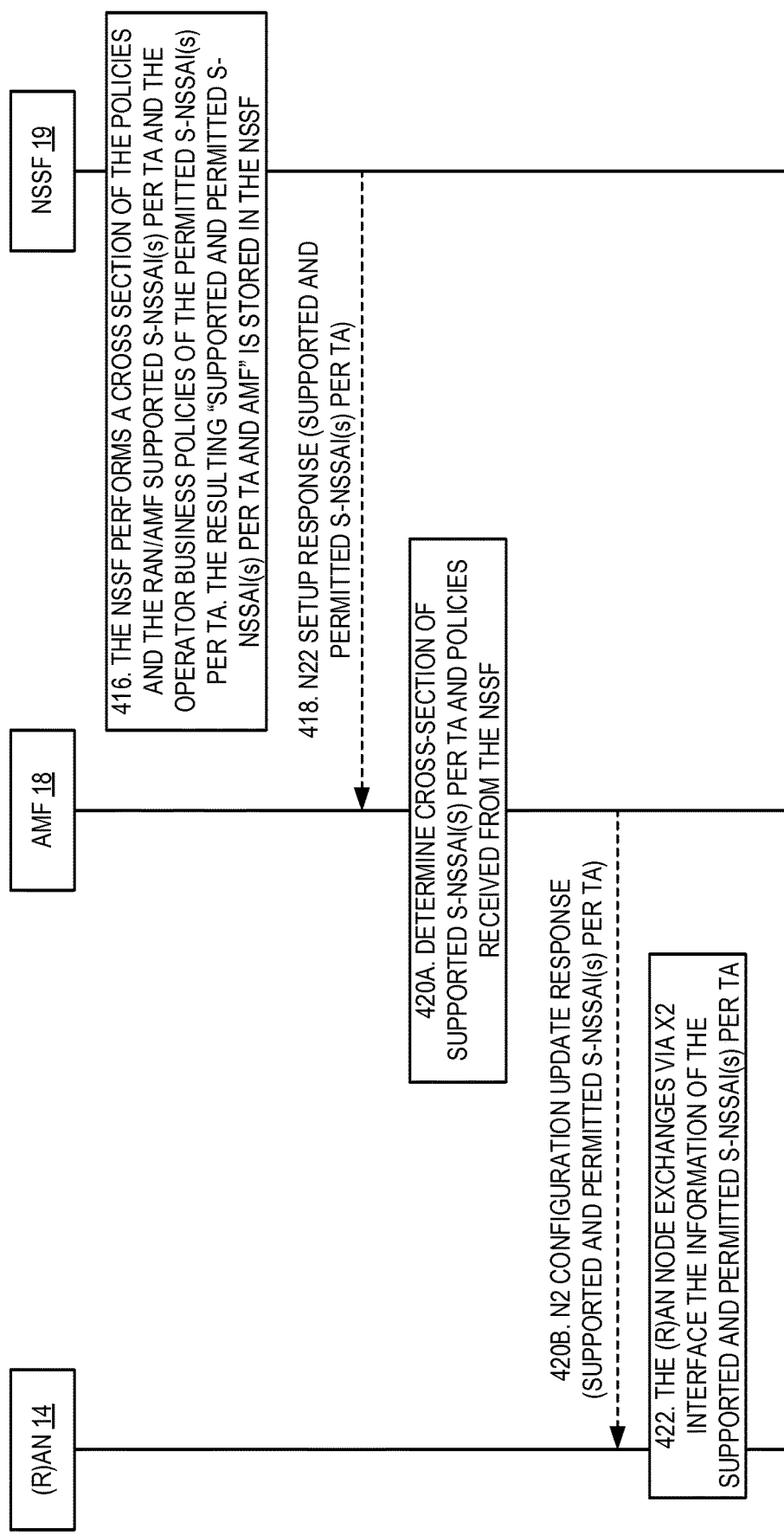

FIGS. 5A and 5B illustrate embodiments in which there is a change in business policies. In particular, upon occurrence of a change of business policies for certain TAs, the NSSF 19 triggers the impacted AMF(s) 18 to a change of configuration. This may trigger additional actions impacting the connected devices to handle the changes in the slice serving areas.

Step 400:

Precondition is that RAN nodes 14, AMF 18, and NSSF 19 are configured and have exchanged the supported and permitted S-NSSAI per TA.

Step 402:

A change of the business policies in the NSSF 18 for certain S-NSSAIs and TAs occurs. The NSSF 18 identifies the impacted AMF(s) 14. The change of the business policies may be due to time based business policies.

Step 404:

The NSSF 19 triggers a request for an update of the permitted S-NSSAI per TA through a N22 slice config update request.

Step 406:

The AMF 18 acknowledges the reception of the update request with an N22 slice config update ack.

Steps 408-422:

Follows steps 304-318 described in FIGS. 4A and 4B.

Figure 6A:
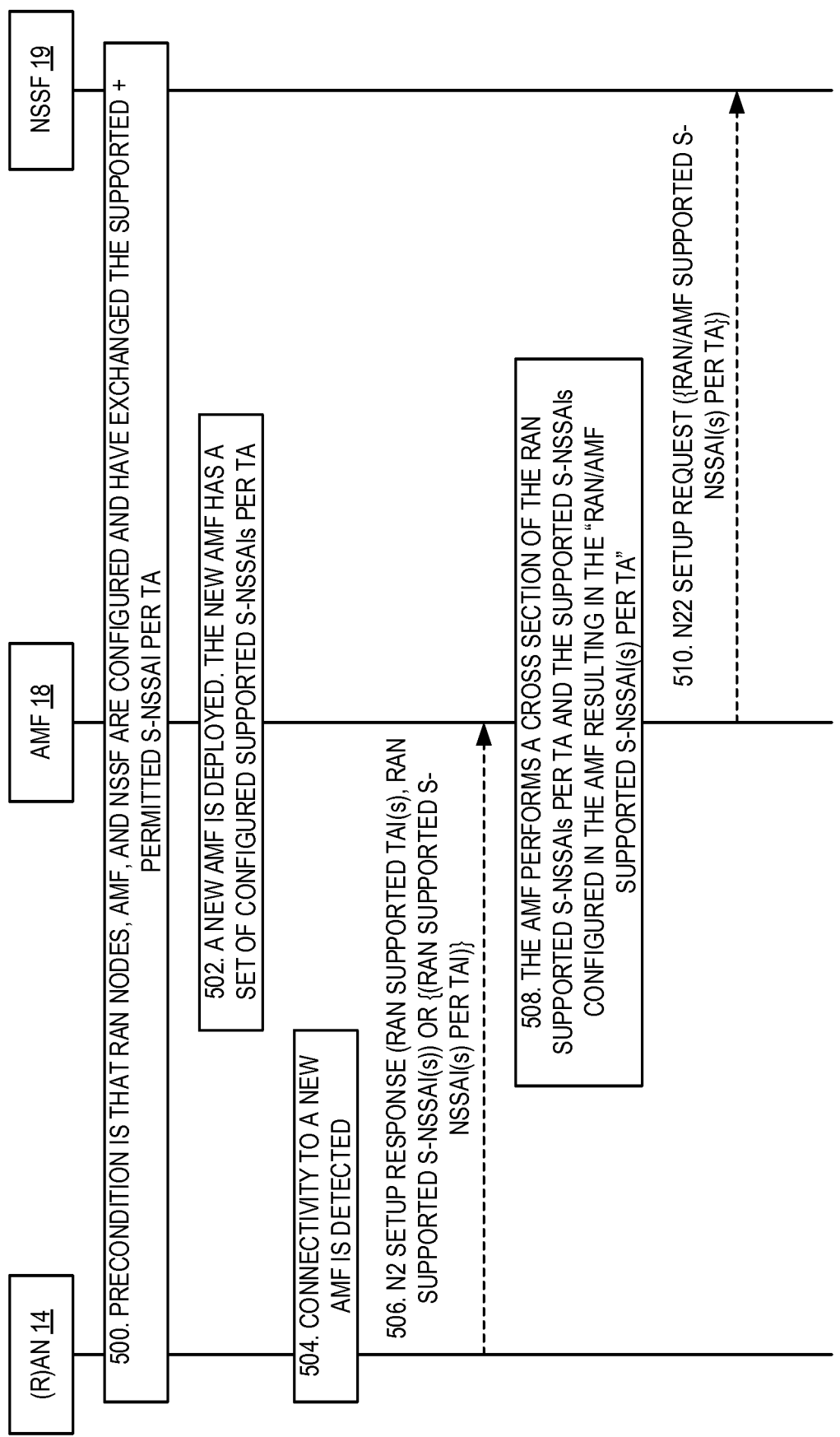
FIGS. 6A and 6B illustrate an embodiment in which information related to network slices supported and permitted per TA is distributed when a new AMF is deployed.
Figure 6B:
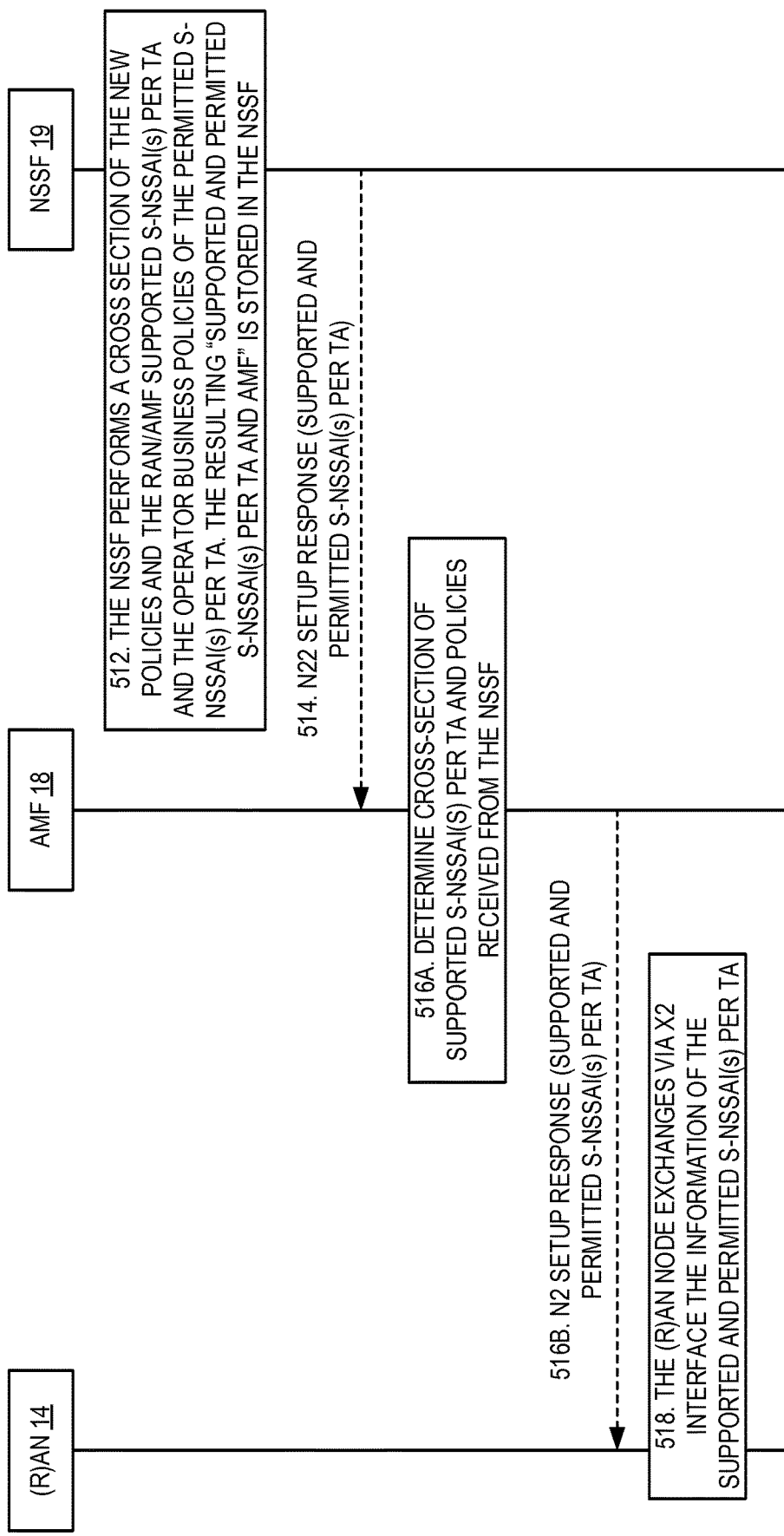

FIGS. 6A and 6B illustrate an embodiment in which a new AMF 18 is deployed. The RAN node 14 detects a new AMF 18. For example, the RAN node 14 performs a DNS look-up based on the TAI(s) that the RAN node 14 to thereby detect any new AMF(s) 18. In some alternative embodiments, the new AMF 18 triggers the RAN node 14 to check for new AMFs. As another alternative, the new AMF 18 reports its existence to the RAN node 14.

Step 500:

Precondition is that RAN nodes 14, AMF 18, and NSSF 19 are configured and have exchanged the supported and permitted S-NSSAI per TA.

Step 502:

A new AMF 18 is deployed. The new AMF 18 has a set of configured supported S-NSSAI per TA.

Step 504:

The RAN nodes 14 detect connectivity to a new AMF 18.

Steps 506-518:

Follows steps 102-114 in FIGS. 2A and 2B. Note that, in some embodiments, the RAN node 14 need not signal to all AMFs 18 because it should be sufficient for the RAN node 14 to signal to the new AMF 18.

Figure 7:
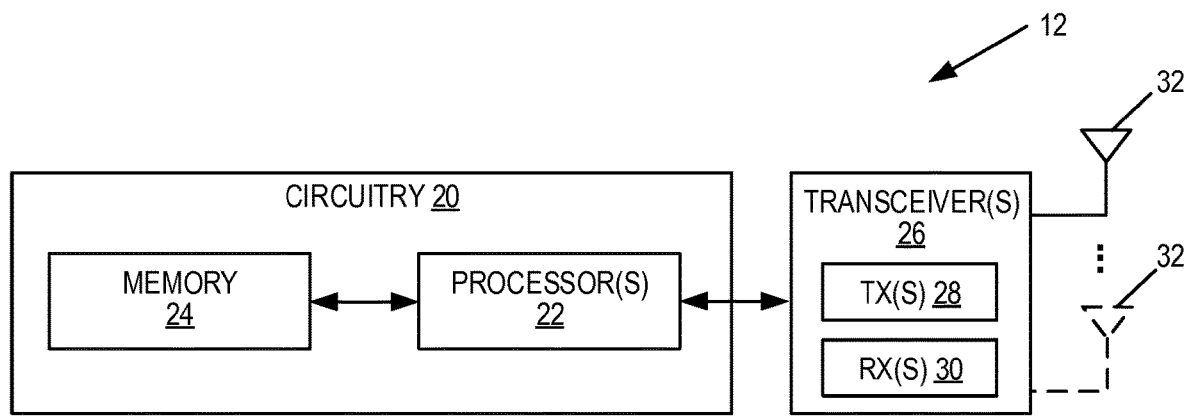
FIGS. 7 and 8 illustrate example embodiments of a wireless device.

FIG. 7 is a schematic block diagram of the wireless communication device 12, or UE 12, according to some embodiments of the present disclosure. As illustrated, the wireless communication device 12 includes circuitry 20 comprising one or more processors 22 (e.g., Central Processing Units (CPUs), Application Specific Integrated Circuits (ASICs), Field Programmable Gate Arrays (FPGAs), Digital Signal Processors (DSPs), and/or the like) and memory 24. The wireless communication device 12 also includes one or more transceivers 26 each including one or more transmitters 28 and one or more receivers 30 coupled to one or more antennas 32. In some embodiments, the functionality of the wireless communication device 12 described herein may be implemented in hardware (e.g., via hardware within the circuitry 20 and/or within the processor(s) 22) or be implemented in a combination of hardware and software (e.g., fully or partially implemented in software that is, e.g., stored in the memory 24 and executed by the processor(s) 22).

In some embodiments, a computer program including instructions which, when executed by the at least one processor 22, causes the at least one processor 22 to carry out at least some of the functionality of the wireless communication device 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 8:
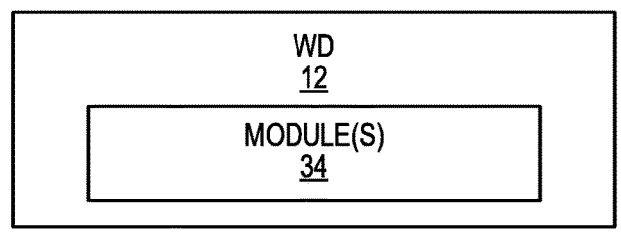

FIG. 8 is a schematic block diagram of the wireless communication device 12, or UE, according to some other embodiments of the present disclosure. The wireless communication device 12 includes one or more modules 34, each of which is implemented in software. The module(s) 34 provide the functionality of the wireless communication device 12 described herein.

Figure 9:
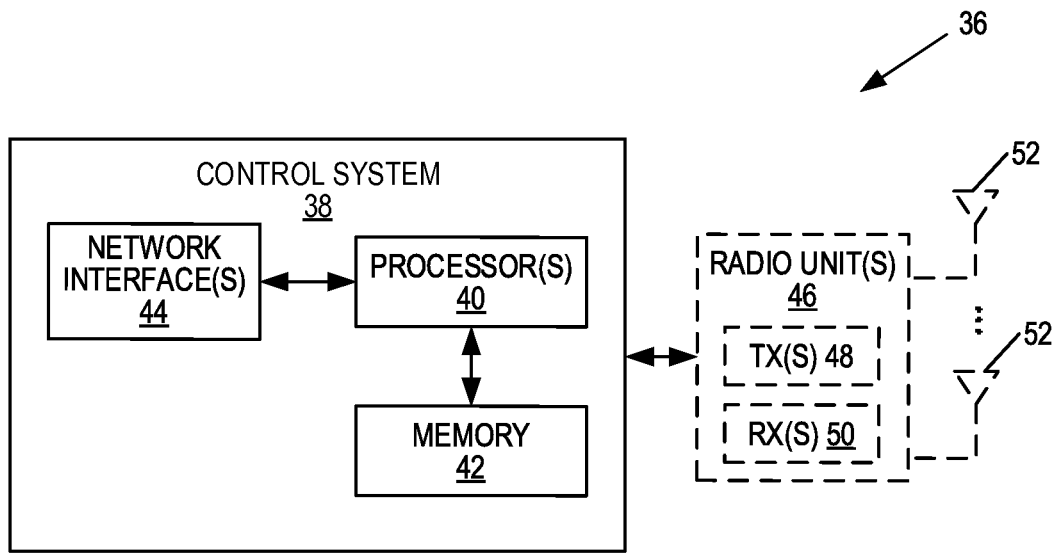
FIGS. 9 to 11 illustrate example embodiments of a network node.

FIG. 9 is a schematic block diagram of a network node 36 (e.g., the RAN node 14 such as, for example, an eNB or gNB or a core network node such as the AMF 18 or NSSF 19) according to some embodiments of the present disclosure. As illustrated, the network node 36 includes a control system 38 that includes circuitry comprising one or more processors 40 (e.g., CPUs, ASICs, DSPs, FPGAs, and/or the like) and memory 42. The control system 38 also includes a network interface 44. In embodiments in which the network node 36 is a radio access node 14, the network node 36 also includes one or more radio units 46 that each include one or more transmitters 48 and one or more receivers 50 coupled to one or more antennas 52. In some embodiments, the functionality of the network node 36 (e.g., the functionality of the RAN node 14 such as, for example, an eNB or gNB or a core network node such as the AMF 18 or NSSF 19) described above (e.g., with respect to FIGS. 2A and 2B, 3A and 3B, 4A and 4B, 5A and 5B, and 6A and 6B) may be fully or partially implemented in software that is, e.g., stored in the memory 42 and executed by the processor(s) 40.

Figure 10:
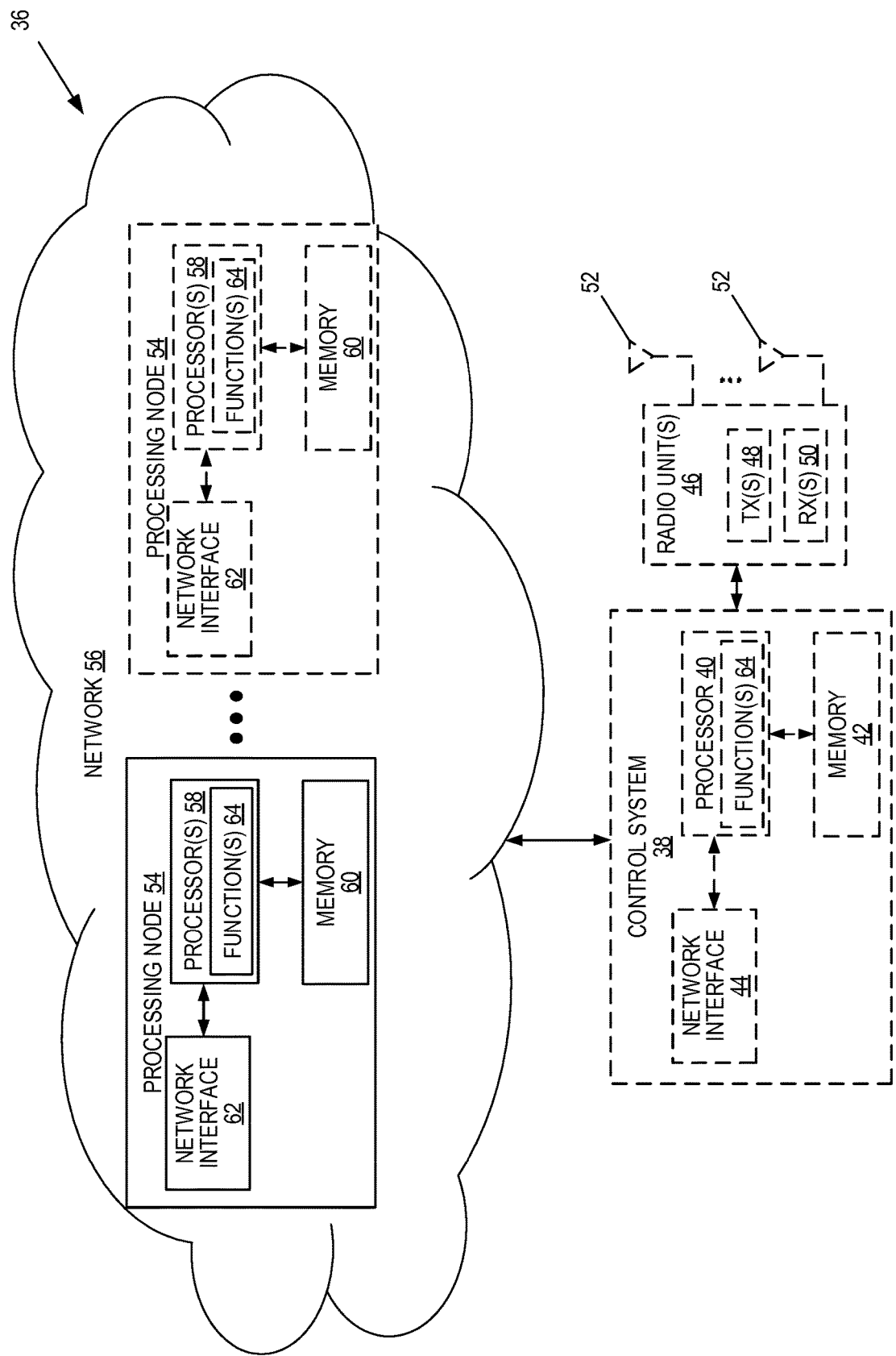

FIG. 10 is a schematic block diagram that illustrates a virtualized embodiment of the network node 36 (e.g., the RAN node 14 such as, for example, an eNB or gNB or a core network node such as the AMF 18 or NSSF 19) according to some embodiments of the present disclosure. As used herein, a "virtualized" network node 36 is a network node 36 in which at least a portion of the functionality of the network node 36 is implemented as a virtual component (e.g., via a virtual machine(s) executing on a physical processing node(s) in a network(s)). As illustrated, the network node 36 optionally includes the control system 38, as described with respect to FIG. 9. In addition, if the network node 36 is the radio access node 14, the network node 36 also includes the one or more radio units 46, as described with respect to FIG. 9. The control system 38 (if present) is connected to one or more processing nodes 54 coupled to or included as part of a network(s) 56 via the network interface 44. Alternatively, if the control system 38 is not present, the one or more radio units 46 (if present) are connected to the one or more processing nodes 54 via a network interface(s). Alternatively, all of the functionality of the network node 36 described herein may be implemented in the processing nodes 54. Each processing node 54 includes one or more processors 58 (e.g., CPUs, ASICs, DSPs, FPGAs, and/or the like), memory 60, and a network interface 62.

In this example, functions 64 of the network node 36 described herein (e.g., the functions of the RAN node 14 such as, for example, an eNB or gNB or a core network node such as the AMF 18 or NSSF 19 described above with respect to, e.g., FIGS. 2A and 2B, 3A and 3B, 4A and 4B, 5A and 5B, and 6A and 6B) are implemented at the one or more processing nodes 54 or distributed across the control system 38 (if present) and the one or more processing nodes 54 in any desired manner. In some particular embodiments, some or all of the functions 64 of the network node 36 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the control system 38 (if present) or alternatively the radio unit(s) 46 (if present) is used in order to carry out at least some of the desired functions. Notably, in some embodiments, the control system 38 may not be included, in which case the radio unit(s) 46 (if present) communicates directly with the processing node(s) 54 via an appropriate network interface(s).

In some particular embodiments, higher layer functionality (e.g., layer 3 and up and possibly some of layer 2 of the protocol stack) of the network node 36 may be implemented at the processing node(s) 54 as virtual components (i.e., implemented "in the cloud") whereas lower layer functionality (e.g., layer 1 and possibly some of layer 2 of the protocol stack) may be implemented in the radio unit(s) 46 and possibly the control system 38.

In some embodiments, a computer program including instructions which, when executed by the at least one processor 40, 58, causes the at least one processor 40, 58 to carry out the functionality of the network node 36 or a processing node 54 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 42, 60).

Figure 11:
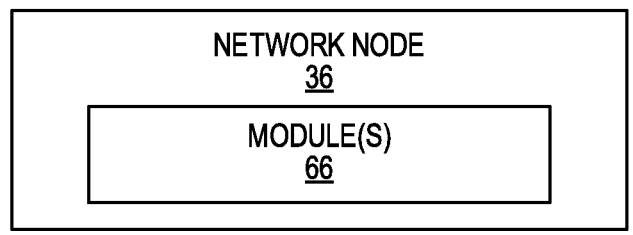

FIG. 11 is a schematic block diagram of the network node 36 according to some other embodiments of the present disclosure. The network node 36 includes one or more modules 66, each of which is implemented in software. The module(s) 66 provide the functionality of the network node 36 described herein (e.g., the functions of the RAN node 14 such as, for example, an eNB or gNB or a core network node such as the AMF 18 or NSSF 19 described above with respect to, e.g., FIGS. 2A and 2B, 3A and 3B, 4A and 4B, 5A and 5B, and 6A and 6B).

Example Embodiments

While not being limited thereto, some example embodiments described above may be summarized in the following manner:

1. A method of operation of a radio access node 14 in a cellular communications network 10, comprising:
    sending 102, 204, 306, 410, 506, to a mobility function entity 18 in a core network of the cellular communications network 10, first information indicative of one or more tracking areas supported by the radio access node 14 and one or more network slices supported by the radio access node 14; and
    receiving 112B, 214B, 316B, 420B, 516B, from the mobility function entity 18, second information indicative of one or more network slices that are:
        (a) supported by the radio access node 14 and the mobility function entity 14 and (b) permitted by one or more network policies, for each of at least one of the one or more tracking areas supported by the radio access node 14, or
        (a) supported by the mobility function entity (14) and (b) permitted by one or more network policies, for each of at least one of the one or more tracking areas supported by the radio access node 14.

2. The method of embodiment 1 wherein sending 102, 204, 306, 410, 506 the first information comprises sending 102 the first information to the mobility management function entity at a time of deployment of the radio access node and instantiation of the mobility function entity.

3. The method of embodiment 1 or 2 wherein:
    sending 102, 204, 306, 410, 506 the first information comprises sending 102 a N2 setup request comprising the first information; and
    receiving 112B, 214B, 316B, 420B, 516B the second information comprises receiving 112B a N2 setup response comprising the second information.

4. The method of embodiment 1 wherein sending 102, 204, 306, 410, 506 the first information comprises sending 204 the first information upon occurrence of a change in the one or more tracking areas supported by the radio access node and/or a change in the one or more network slices supported by the radio access node.

5. The method of embodiment 1 or 4 wherein:
  sending 102, 204, 306, 410, 506 the first information comprises sending 204 a N2 configuration update request comprising the first information; and
  receiving 112B, 214B, 316B, 420B, 516B the second information comprises receiving 214B a N2 configuration update response comprising the second information.
6. The method of embodiment 1 wherein sending 102, 204, 306, 410, 506 the first information comprises sending 306, 410 the first information upon receiving a command from the mobility function entity.
7. The method of embodiment 1 or 6 further comprising:
  receiving 304, 408 a N2 configuration update command from the mobility function entity;
  wherein:
    sending 102, 204, 306, 410, 506 the first information comprises sending 306, 410 a N2 configuration update request comprising the first information upon receiving the N2 configuration update command; and
    receiving 112B, 214B, 316B, 420B, 516B the second information comprises receiving 316B, 420B a N2 configuration update response comprising the second information.
8. The method of embodiment 1 further comprising:
  detecting 504 connectivity to the mobility function entity 14 as a new mobility function entity;
  wherein sending 102, 204, 306, 410, 506 the first information comprises sending 506 a N2 setup response to the mobility function entity 14 upon detecting 504 connectivity to the mobility function entity 14.
9. The method of any one of embodiments 1 to 8 further comprising exchanging 114, 216, 318, 422, 518 the second information with one or more other radio access nodes.
10. A radio access node 14 for a cellular communications network 10, the radio access node 14 adapted to perform the method of any one of embodiments 1 to 9.
11. A radio access node 14 for a cellular communications network 10, comprising:
  a network interface 44, 62;
  at least one processor 40, 58; and
  memory 42, 60 comprising instructions executable by the at least one processor 40, 58 whereby the radio access node 14 is operable to perform the method of any one of embodiments 1 to 9.
12. A radio access node 14 for a cellular communications network 10, comprising:
  one or more modules 66 operable to perform the method of any one of embodiments 1 to 9.
13. A method of operation of a mobility function entity 18 in a core network 17 of a cellular communications network 10, comprising:
  receiving 102, 204, 306, 410, 506, from a radio access node 14 of the cellular communications network 10, first information indicative of one or more tracking areas supported by the radio access node 14 and one or more network slices supported by the radio access node 14;
  determining 112A, 214A, 316A, 420A, 516A one or more network slices that are: (a) supported by the radio access node 14 and the mobility function entity 18 and (b) permitted by one or more network policies, for each of at least one of the one or more tracking areas supported by the radio access node 14;
  sending 112B, 214B, 316B, 420B, 516B, to the radio access node 14, second information indicative of the one or more network slices that are: (a) supported by the radio access node 14 and the mobility function entity 18 and (b) permitted by one or more network policies, for each of the at least one of the one or more tracking areas supported by the radio access node 14.
14. The method of embodiment 13 further comprising:
  obtaining 106, 110; 208, 212; 310, 314; 414, 418; 510, 514 third information indicative of one or more network slices that are permitted by the one or more network policies for each of the at least one of the one or more tracking areas supported by the radio access node;
  wherein determining 112A, 214A, 316A, 420A, 516A the one or more network slices that are: (a) supported by the radio access node and the mobility function entity and (b) permitted by one or more network policies, for each of the at least one of the one or more tracking areas supported by the radio access node, comprises:
    for each of the at least one of the one or more tracking areas supported by the radio access node, determining 112A, 214A, 316A, 420A, 516A the one or more network slices for the tracking area that are: a supported by the radio access node and the mobility function entity and b permitted by the one or more network policies based on the third information.
15. The method of embodiment 13 further comprising:
  determining 104, 206, 308, 412, 508, for each of at least one of the one or more tracking areas supported by the radio access node, one or more network slices that are supported by both the radio access node and the mobility function entity for the tracking area; and
  sending 106, 208, 310, 414, 510, to a network slice selection function entity 19, third information that is indicative of the one or more network slices that are supported by both the radio access node 14 and the mobility function entity 18 for each of at least one of the one or more tracking areas supported by the radio access nodes.
16. The method of embodiment 15 wherein determining 112A, 214A, 316A, 420A, 516A the one or more network slices that are: a supported by the radio access node and the mobility function entity and b permitted by one or more network policies, for each of the at least one of the one or more tracking areas supported by the radio access node, comprises:
  receiving 110, 212, 314, 418, 514, from the network slice selection function entity 18, fourth information indicative of one or more network slices that are permitted by the one or more network policies for each of the at least one of the one or more tracking areas supported by the radio access node; and
  for each of the at least one of the one or more tracking areas supported by the radio access node, determining 112A, 214A, 316A, 420A, 516A the one or more network slices for the tracking area that are: (a) supported by the radio access node and the mobility function entity and (b) permitted by the one or more network policies based on the fourth information.
17. The method of any one of embodiments 13 to 16 wherein receiving 102, 204, 306, 410, 506 the first information comprises receiving 102 the first information at a time of deployment of the radio access node and instantiation of the mobility function entity.
18. The method of any one of embodiments 13 to 17 wherein:

receiving 102, 204, 306, 410, 506 the first information comprises receiving 102 a N2 setup request comprising the first information; and sending 112B, 214B, 316B, 420B, 516B the second information comprises sending 112B a N2 setup response comprising the second information.

19. The method of any one of embodiments 13 to 17 wherein receiving 102, 204, 306, 410, 506 the first information comprises receiving 204 the first information upon occurrence of a change in the one or more tracking areas supported by the radio access node and/or a change in the one or more network slices supported by the radio access node.

20. The method of any one of embodiments 12 to 16 or 18 wherein:

receiving 102, 204, 306, 410, 506 the first information comprises receiving 204 a N2 configuration update request comprising the first information; and sending 112B, 214B, 316B, 420B, 516B the second information comprises sending 214B a N2 configuration update response comprising the second information.

21. The method of any one of embodiments 13 to 17 further comprising: sending 304, to the radio access node, an update command upon occurrence in a change of the one or more network slices supported by the mobility function entity; and wherein receiving 102, 204, 306, 410, 506 the first information comprises receiving 306 the first information in response to sending the update command.

22. The method of embodiment 21 wherein the update command is an N2 configuration update command, and receiving 306 the first information comprises receiving 306 a N2 configuration update request comprising the first information upon receiving the N2 configuration update command; and sending 316B the second information comprises sending 316B a N2 configuration update response comprising the second information.

23. The method of any one of embodiments 13 to 17 further comprising: receiving 404, from a network slice selection function entity, an update request;

upon receiving 404 the update request, sending 408, to the radio access node, an update command; and wherein receiving 102, 204, 306, 410, 506 the first information comprises receiving 410 the first information in response to sending the update command.

24. The method of embodiment 23 wherein the update request is an N22 slice configuration update request, the update command is an N2 configuration update command, and receiving 410 the first information comprises receiving 410 a N2 configuration update request comprising the first information upon receiving the N2 configuration update command; and sending 420B the second information comprises sending 420B a N2 configuration update response comprising the second information.

25. A network node that implements a mobility function entity for a core network of a cellular communications system, the network node adapted to perform the method of any one of embodiments 13 to 24.

26. A network node 36 that implements a mobility function entity 18 for a core network 17 of a cellular communications system 10, comprising:

at least one processor 40, 58; and memory 42, 60 comprising instructions executable by the at least one processor 40, 58 whereby the network node is operable to perform the method of any one of embodiments 13 to 24.

27. A network node 36 that implements a mobility function entity 18 for a core network 17 of a cellular communications system 10, comprising:

one or more modules 66 operable to perform the method of any one of embodiments 13 to 24.

28. A method of operation of a mobility function entity 18 in a core network 17 of a cellular communications network 10, comprising:

determining 112A, 214A, 316A, 420A, 516A one or more network slices that are: (a) supported by the mobility function entity 18 and (b) permitted by one or more network policies, for each of at least one of one or more tracking areas supported by the radio access node 14; and sending 112B, 214B, 316B, 420B, 516B, to the radio access node 14, second information indicative of the one or more network slices that are: (a) supported by the mobility function entity 18 and (b) permitted by one or more network policies, for each of the at least one of the one or more tracking areas supported by the radio access node 14.

The following acronyms are used throughout this disclosure.

3GPP Third Generation Partnership Project
5G Fifth Generation
AMF Access and Mobility Management Function
DNS Domain Name System
GUAMI Globally Unique Authentication Management Function Identifier
ID Identifier
NSSAI Network Slice Selection Assistance Information
NSSF Network Slice Selection Function
PDU Protocol Data Unit
PLMN Public Land Mobile Network
RAN Radio Access Network
SMF Session Management Function
S-NSSAI Single Network Slice Selection Assistance Information
TA Tracking Area
TAI Tracking Area Identity
TS Technical Specification
UE User Equipment
UP User Plane Those skilled in the art will recognize improvements and modifications to the embodiments of the present disclosure. All such improvements and modifications are considered within the scope of the concepts disclosed herein.

The invention claimed is:

1. A method of operation of a radio access node in a cellular communications network comprising:

sending, to a mobility function entity in a core network of the cellular communications network, first information indicative of one or more tracking areas supported by the radio access node and one or more network slices supported by the radio access node; and receiving, from the mobility function entity, second information indicative of one or more network slices that are:

(a) supported by the radio access node and the mobility function entity and (b) permitted by one or more network policies, for each of at least one of the one or more tracking areas supported by the radio access node, or (a) supported by the mobility function entity and (b) permitted by one or more network policies, for each of at least one of the one or more tracking areas supported by the radio access node.

2. The method of claim 1 wherein sending the first information comprises sending the first information to the mobility management function entity at a time of deployment of the radio access node and instantiation of the mobility function entity.

3. The method of claim 1 wherein:
sending the first information comprises sending a N2 setup request comprising the first information; and
receiving the second information comprises receiving a N2 setup response comprising the second information.

4. The method of claim 1 wherein sending the first information comprises sending the first information upon occurrence of a change in the one or more tracking areas supported by the radio access node and/or a change in the one or more network slices supported by the radio access node.

5. The method of claim 1 wherein:
sending the first information comprises sending a N2 configuration update request comprising the first information; and
receiving the second information comprises receiving a N2 configuration update response comprising the second information.

6. The method of claim 1 wherein sending the first information comprises sending the first information upon receiving a command from the mobility function entity.

7. The method of claim 1 further comprising:
receiving a N2 configuration update command from the mobility function entity;
wherein:
sending the first information comprises sending a N2 configuration update request comprising the first information upon receiving the N2 configuration update command; and
receiving the second information comprises receiving a N2 configuration update response comprising the second information.

8. The method of claim 1 further comprising:
detecting connectivity to the mobility function entity as a new mobility function entity;
wherein sending the first information comprises sending a N2 setup response to the mobility function entity upon detecting connectivity to the mobility function entity.

9. The method of claim 1 further comprising exchanging the second information with one or more other radio access nodes.

10. A radio access node for a cellular communications network, comprising:
a network interface;
at least one processor; and
memory comprising instructions executable by the at least one processor whereby the radio access node is operable to:
send, to a mobility function entity in a core network of the cellular communications network, first information indicative of one or more tracking areas supported by the radio access node and one or more network slices supported by the radio access node; and
receive, from the mobility function entity, second information indicative of one or more network slices that are:

(a) supported by the radio access node and the mobility function entity and (b) permitted by one or more network policies, for each of at least one of the one or more tracking areas supported by the radio access node, or
(a) supported by the mobility function entity and (b) permitted by one or more network policies, for each of at least one of the one or more tracking areas supported by the radio access node.

11. A method of operation of a mobility function entity in a core network of a cellular communications network, comprising:
receiving, from a radio access node of the cellular communications network, first information indicative of one or more tracking areas supported by the radio access node and one or more network slices supported by the radio access node;
determining one or more network slices that are: (a) supported by the radio access node and the mobility function entity and (b) permitted by one or more network policies, for each of at least one of the one or more tracking areas supported by the radio access node; and
sending, to the radio access node, second information indicative of the one or more network slices that are: (a) supported by the radio access node and the mobility function entity and (b) permitted by one or more network policies, for each of the at least one of the one or more tracking areas supported by the radio access node.

12. The method of claim 11 further comprising:
obtaining third information indicative of one or more network slices that are permitted by the one or more network policies for each of the at least one of the one or more tracking areas supported by the radio access node;
wherein determining the one or more network slices that are: (a) supported by the radio access node and the mobility function entity and (b) permitted by one or more network policies, for each of the at least one of the one or more tracking areas supported by the radio access node, comprises:
for each of the at least one of the one or more tracking areas supported by the radio access node, determining the one or more network slices for the tracking area that are: (a) supported by the radio access node and the mobility function entity and (b) permitted by the one or more network policies based on the third information.

13. The method of claim 11 further comprising:
determining, for each of at least one of the one or more tracking areas supported by the radio access node, one or more network slices that are supported by both the radio access node and the mobility function entity for the tracking area; and
sending, to a network slice selection function entity, third information that is indicative of the one or more network slices that are supported by both the radio access node and the mobility function entity for each of at least one of the one or more tracking areas supported by the radio access nodes.

14. The method of claim 13 wherein determining the one or more network slices that are: (a) supported by the radio access node and the mobility function entity and (b) permitted by one or more network policies, for each of the at least one of the one or more tracking areas supported by the radio access node, comprises:

receiving, from the network slice selection function entity, fourth information indicative of one or more network slices that are permitted by the one or more network policies for each of the at least one of the one or more tracking areas supported by the radio access node; and for each of the at least one of the one or more tracking areas supported by the radio access node, determining the one or more network slices for the tracking area that are: (a) supported by the radio access node and the mobility function entity and (b) permitted by the one or more network policies based on the fourth information.

15. The method of claim 13 wherein receiving the first information comprises receiving the first information at a time of deployment of the radio access node and instantiation of the mobility function entity.

16. The method of claim 13 wherein:
receiving the first information comprises receiving a N2 setup request comprising the first information; and
sending the second information comprises sending a N2 setup response comprising the second information.

17. The method of claim 13 wherein receiving the first information comprises receiving the first information upon occurrence of a change in the one or more tracking areas supported by the radio access node and/or a change in the one or more network slices supported by the radio access node.

18. The method of claim 13 wherein:
receiving the first information comprises receiving a N2 configuration update request comprising the first information; and
sending the second information comprises sending a N2 configuration update response comprising the second information.

19. The method of claim 13 further comprising:
sending, to the radio access node, an update command upon occurrence in a change of the one or more network slices supported by the mobility function entity; and
wherein receiving the first information comprises receiving the first information in response to sending the update command.

20. The method of claim 19 wherein the update command is an N2 configuration update command, and
receiving the first information comprises receiving a N2 configuration update request comprising the first information upon receiving the N2 configuration update command; and
sending the second information comprises sending a N2 configuration update response comprising the second information.

21. The method of claim 13 further comprising:
receiving, from a network slice selection function entity, an update request;
upon receiving the update request, sending, to the radio access node, an update command; and
wherein receiving the first information comprises receiving the first information in response to sending the update command.

22. The method of claim 21 wherein the update request is an N22 slice configuration update request, the update command is an N2 configuration update command, and
receiving the first information comprises receiving a N2 configuration update request comprising the first information upon receiving the N2 configuration update command; and
sending the second information comprises sending a N2 configuration update response comprising the second information.

23. A network node that implements a mobility function entity for a core network of a cellular communications system, comprising:
at least one processor; and
memory comprising instructions executable by the at least one processor whereby the network node is operable to:
receive, from a radio access node of the cellular communications network, first information indicative of one or more tracking areas supported by the radio access node and one or more network slices supported by the radio access node;
determine one or more network slices that are: (a) supported by the radio access node and the mobility function entity and (b) permitted by one or more network policies, for each of at least one of the one or more tracking areas supported by the radio access node; and
send, to the radio access node, second information indicative of the one or more network slices that are: (a) supported by the radio access node and the mobility function entity and (b) permitted by one or more network policies, for each of the at least one of the one or more tracking areas supported by the radio access node.

24. A method of operation of a mobility function entity in a core network of a cellular communications network, comprising:
determining one or more network slices that are: (a) supported by the mobility function entity and (b) permitted by one or more network policies, for each of at least one of one or more tracking areas supported by the radio access node; and
sending, to the radio access node, second information indicative of the one or more network slices that are: (a) supported by the mobility function entity and (b) permitted by one or more network policies, for each of the at least one of the one or more tracking areas supported by the radio access node.

* * * * *

UNITED STATES PATENT AND TRADEMARK OFFICE
CERTIFICATE OF CORRECTION

Page 1 of 1

PATENT NO. : 11,115,838 B2
APPLICATION NO. : 16/345110
DATED : September 7, 2021
INVENTOR(S) : Hedman et al.

It is certified that error appears in the above-identified patent and that said Letters Patent is hereby corrected as shown below:

In the Specification

In Column 4, Line 49, delete "constrains" and insert -- constraints --, therefor.

In the Claims

In Column 14, Line 54, in Claim 1, delete "network" and insert -- network, --, therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*